(12) United States Patent
Li et al.

(10) Patent No.: US 11,341,169 B2
(45) Date of Patent: May 24, 2022

(54) ADAPTIVE DATA CLUSTERING FOR DATABASES

(71) Applicant: ALIBABA GROUP HOLDING LIMITED, Grand Cayman (KY)

(72) Inventors: Huaizhi Li, San Mateo, CA (US); Hong Wu, San Mateo, CA (US); Tieying Zhang, San Mateo, CA (US); Ruiping Li, San Mateo, CA (US); Fang Zheng, San Mateo, CA (US); Xiaowei Zhu, San Mateo, CA (US); Congnan Luo, San Mateo, CA (US); Cheng Zhu, San Mateo, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 201 days.

(21) Appl. No.: 16/655,111

(22) Filed: Oct. 16, 2019

(65) Prior Publication Data
US 2021/0117447 A1    Apr. 22, 2021

(51) Int. Cl.
*G06F 17/00* (2019.01)
*G06F 16/28* (2019.01)
(Continued)

(52) U.S. Cl.
CPC ........ *G06F 16/285* (2019.01); *G06F 16/2237* (2019.01); *G06F 16/2455* (2019.01);
(Continued)

(58) Field of Classification Search
CPC ............... G06F 16/285; G06F 16/2455; G06F 16/2237; G06N 20/10; G06N 3/084;
(Continued)

(56) References Cited

U.S. PATENT DOCUMENTS 10,235,453 B2 * 3/2019 Simard ............... G06F 3/04842
10,949,825 B1 * 3/2021 Brosamer ............. G06Q 30/04
(Continued)

OTHER PUBLICATIONS

Sam S. Lightstone and Bishwaranjan Bhattacharjee. 2004. Automated design of multidimensional clustering tables for relational databases. In Proceedings of the Thirtieth international conference on Very large data bases—vol. 30 (VLDB '04). VLDB Endowment, 1170-1181. (Year: 2004).*

Guinepain et al., "Using Cluster Computing to Support Automatic and Dynamic Database Clustering," Institute of Electrical and Electronics Engineers, invited talk, third international workshop on automatic performance tuning, 394-401 (2008).

(Continued)

*Primary Examiner* — Greta L Robinson
(74) *Attorney, Agent, or Firm* — Finnegan, Henderson, Farabow, Garrett & Dunner, LLP

(57) ABSTRACT

The present disclosure provides a method for generating a classification model in a database system. The method comprises generating a plurality of database tables by performing data clustering on a database, acquiring a plurality of queries associated with information from the database, generating training data by executing each of the plurality of queries on the plurality of database tables, and training a classification model using the training data, wherein the classification model is used to select a database table for a query based on corresponding performance information associated with the query on the database during executing of the query. The present disclosure also provides a method for executing a query on a database using a classification model. The method comprises obtaining the classification model, obtaining a database query, generating a target table by inputting the database query into the classification model, and executing the database query on the target table. In addition, the present disclosure provides database systems and non-transitory computer-readable media for generating a classification model or executing a query on a database using a classification model.

20 Claims, 11 Drawing Sheets

| id | num | name | date |
|---|---|---|---|
| 11 | 100 | 's3' | 2018-06-22 |
| 112 | 91 | 's2' | 2016-08-22 |
| 11 | 222 | 's1' | 2017-06-22 |
| 199 | 15 | 's5' | 2016-06-22 |
| 112 | 512 | 's4' | 2016-05-21 |
| 112 | 21 | 's6' | 2016-10-15 |

Table 1A

Data Clustering (id, date) ⟹

| id | num | name | date |
|---|---|---|---|
| 11 | 222 | 's1' | 2017-06-22 |
| 11 | 100 | 's3' | 2018-06-22 |
| 112 | 512 | 's4' | 2016-05-21 |
| 112 | 91 | 's2' | 2016-08-22 |
| 112 | 21 | 's6' | 2016-10-15 |
| 119 | 15 | 's5' | 2016-06-22 |

Table 1B

(51) Int. Cl.
*G06F 16/2455* (2019.01)
*G06F 16/22* (2019.01)
*G06N 20/10* (2019.01)
*G06K 9/62* (2022.01)
*G06N 3/08* (2006.01)

(52) U.S. Cl.
CPC ......... *G06K 9/6218* (2013.01); *G06K 9/6269* (2013.01); *G06N 3/084* (2013.01); *G06N 20/10* (2019.01)

(58) Field of Classification Search
CPC ...... G06N 3/0481; G06N 3/0445; G06N 3/08; G06K 9/6218; G06K 9/6269; G06K 9/6272
See application file for complete search history.

(56) References Cited

U.S. PATENT DOCUMENTS

| | | | |
|---|---|---|---|
| 11,176,206 B2* | 11/2021 | Adir | G06F 16/906 |
| 2012/0054184 A1* | 3/2012 | Masud | G06F 16/285 |
| | | | 707/737 |
| 2015/0127455 A1* | 5/2015 | Penzotti | G06Q 30/0251 |
| | | | 705/14.49 |
| 2021/0182659 A1* | 6/2021 | Makhija | G06F 16/2379 |

OTHER PUBLICATIONS

Guinepain et al., "Research Issues in Automatic Database Clustering," SIGMOD Record, vol. 34 No. 1, 33-38 (2005).
U.S. Appl. No. 16/414,218, filed May 16, 2019, entitled Methods and Devices for Dynamic Filter Pushdown for Massive Parallel Processing Databases on Cloud, 28 pages.

* cited by examiner

ADAPTIVE DATA CLUSTERING FOR DATABASES

BACKGROUND

Increasing the sizes of database has allowed for big data analysis, which is unlocking potentials in data and data querying. Many companies have developed database querying techniques to allow for quicker and less computationally intensive scanning of large amounts of data. One of the techniques is data clustering.

While data clustering can improve the overall efficiency of querying, it has its drawbacks. For example, the inefficiency of selecting the right data clustering algorithm may lead to unnecessary processing, decreased efficiency, and increased computational times. Additionally, the lack of support for dynamic and adaptive data clustering leads to an inability to make real-time adjustments to data clustering on a large amount of data in databases. Furthermore, the lack of an effective scheme for dynamic and adaptive data clustering causes redundancy and unnecessary computation, leading to decreased efficiency and increased computational times.

SUMMARY

Embodiments of the present disclosure provides a method for generating a classification model in a database system. The method comprises generating a plurality of database tables by performing data clustering on a database, acquiring a plurality of queries associated with information from the database, generating training data by executing each of the plurality of queries on the plurality of database tables, and training a classification model using the training data, wherein the classification model is used to select a database table for a query based on corresponding performance information associated with the query on the database during executing of the query.

Embodiments of the present disclosure also provides a method for executing a query on a database using a classification model. The method comprises obtaining the classification model wherein the classification model is used to select a database table for a query based on corresponding performance information associated with the query on the database during execution of the query, obtaining a database query, generating a target table by inputting the database query into the classification model, and executing the database query on the target table.

Moreover, embodiments of the present disclosure provides database systems generating a classification model. The database system comprises a memory and a processor configured to generate a plurality of database tables by performing data clustering on a database, acquire a plurality of queries associated with information from the database, generate training data by executing each of the plurality of queries on the plurality of database tables, and train a classification model using the training data.

Moreover, embodiments of the present disclosure provides database systems for executing a query on a database using a classification model. The database system comprises a memory and a processor configured to obtain the classification model wherein the classification model is used to select a database table for a query based on corresponding performance information associated with the query on the database during execution of the query, obtain a database query, generate a target table by inputting the database query into the classification model, and execute the database query on the target table.

Moreover, embodiments of the present disclosure also provide non-transitory computer readable media that store a set of instructions that are executable by one or more processors of an apparatus to perform a method for generating a classification model in a database system. The method comprises generating a plurality of database tables by performing data clustering on a database, acquiring a plurality of queries associated with information from the database, generating training data by executing each of the plurality of queries on the plurality of database tables, and training a classification model using the training data, wherein the classification model is used to select a database table for a query based on corresponding performance information associated with the query on the database during executing of the query.

Moreover, embodiments of the present disclosure also provide non-transitory computer readable media that store a set of instructions that are executable by one or more processors of an apparatus to perform a method for executing a query on a database using a classification model. The method comprises obtaining the classification model wherein the classification model is used to select a database table for a query based on corresponding performance information associated with the query on the database during execution of the query, obtaining a database query, generating a target table by inputting the database query into the classification model, and executing the database query on the target table.

BRIEF DESCRIPTION OF THE DRAWINGS

The accompanying drawings, which are incorporated in and constitute a part of this specification, illustrate embodiments consistent with the invention and, together with the description, explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Many of the modern databases are columnar databases, which store data in columns rather than in rows. Columnar databases can improve an overall performance of analytical queries. For example, columnar databases can reduce input/output cost of queries since generally a query only reads a portion of columns in a table. Moreover, columnar databases can achieve better compression since data in a column is often of a same type.

A column can be divided into blocks of certain sizes. For example, if a block contains 10,000 rows, a column with 1,000,000 rows may consist of 100 blocks. Within a block, statistics may be collected and processed, including the minimum or maximum values of data in the block, histograms of data in the block, etc. These statistics can then be used during query execution to improve query performances.

Figure 1:
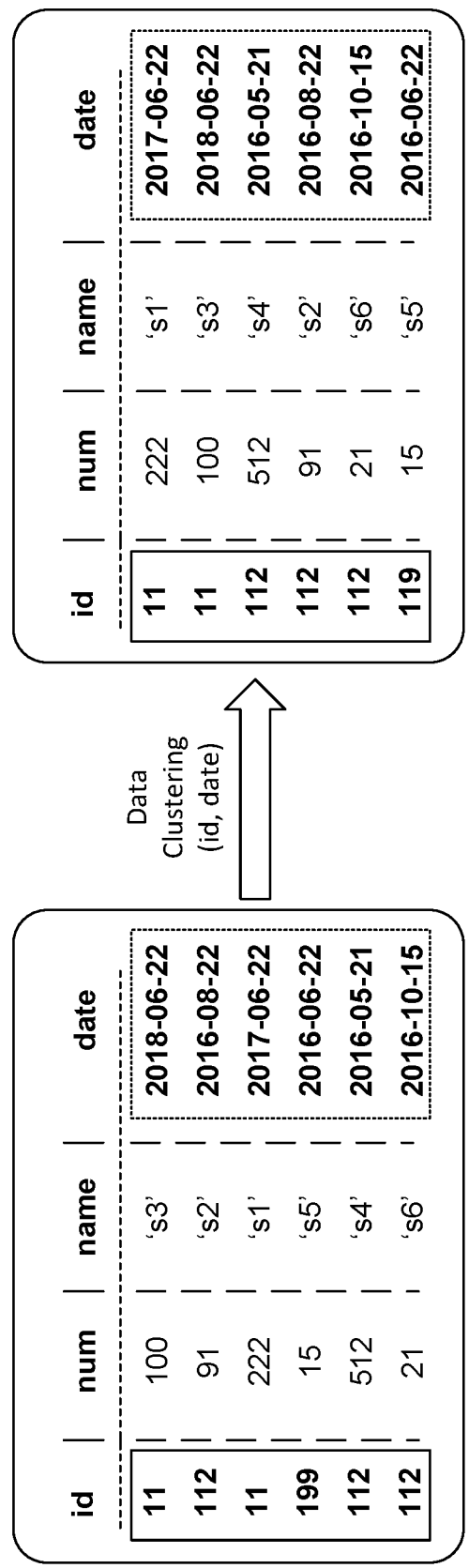
FIG. 1 illustrates an exemplary table of four columns of data with data clustering.

Data clustering is a process of organizing a set of data into groups of similar data. Data clustering is widely used in columnar databases. FIG. 1 illustrates an exemplary table of four columns of data with data clustering. As shown in FIG. 1, Table 1A has four columns, namely "id," "number," "name," and "date." Data clustering is performed on Table 1A by sorting the data with the "id" column first and then the "date" column. The "id" and "date" columns are referred to as filter columns. After the data clustering has been performed, data is organized as shown in Table 1B. In Table 1B, data is sorted from the smallest "id" to the largest "id." When the values of "id" are the same, data is then sorted from the earliest "date" to the latest "date."

If a query is made on FIG. 1's Table 1A and Table 1B to search for a minimum or maximum value in the "date" column, provided that the value in the "id" column must equal to a certain value (e.g., 112), Table 1B can provide a search result much more efficiently compared to Table 1A. As a result, the overall efficiency of querying in the columnar database can be improved.

Different algorithms of data clustering can produce different tables, and each table may produce varying efficiency in executing specific queries on the database. Using FIG. 1 as an example, if 90% of queries on the database are associated with the "id" column (e.g., looking for the specific "id"), then a table produced by a data clustering algorithm that sorts the "id" column (e.g., the algorithm that produced Table 1B) would provide a better average execution efficiency than Table 1A where entries in the "id" column are scattered randomly. Therefore, picking the right data clustering algorithm can have immense impact on the overall performance of query execution on a database.

Conventional database systems perform data clustering by asking users to hand pick filter columns. For example, a user may pick the "name" column of FIG. 1's Table 1A as the filter column before data clustering is performed. As a result, filter columns of data clustering in conventional database systems are manually selected and hence they are static. If the data distribution changes in the database, or if more recent queries focus more on other columns (e.g., "id" column in FIG. 1), the old table produced by sorting the "name" column is no longer efficient in executing recent queries. Therefore, there exists a need to dynamically produce up-to-date tables using data clustering algorithms that best serve incoming queries.

Figure 2:
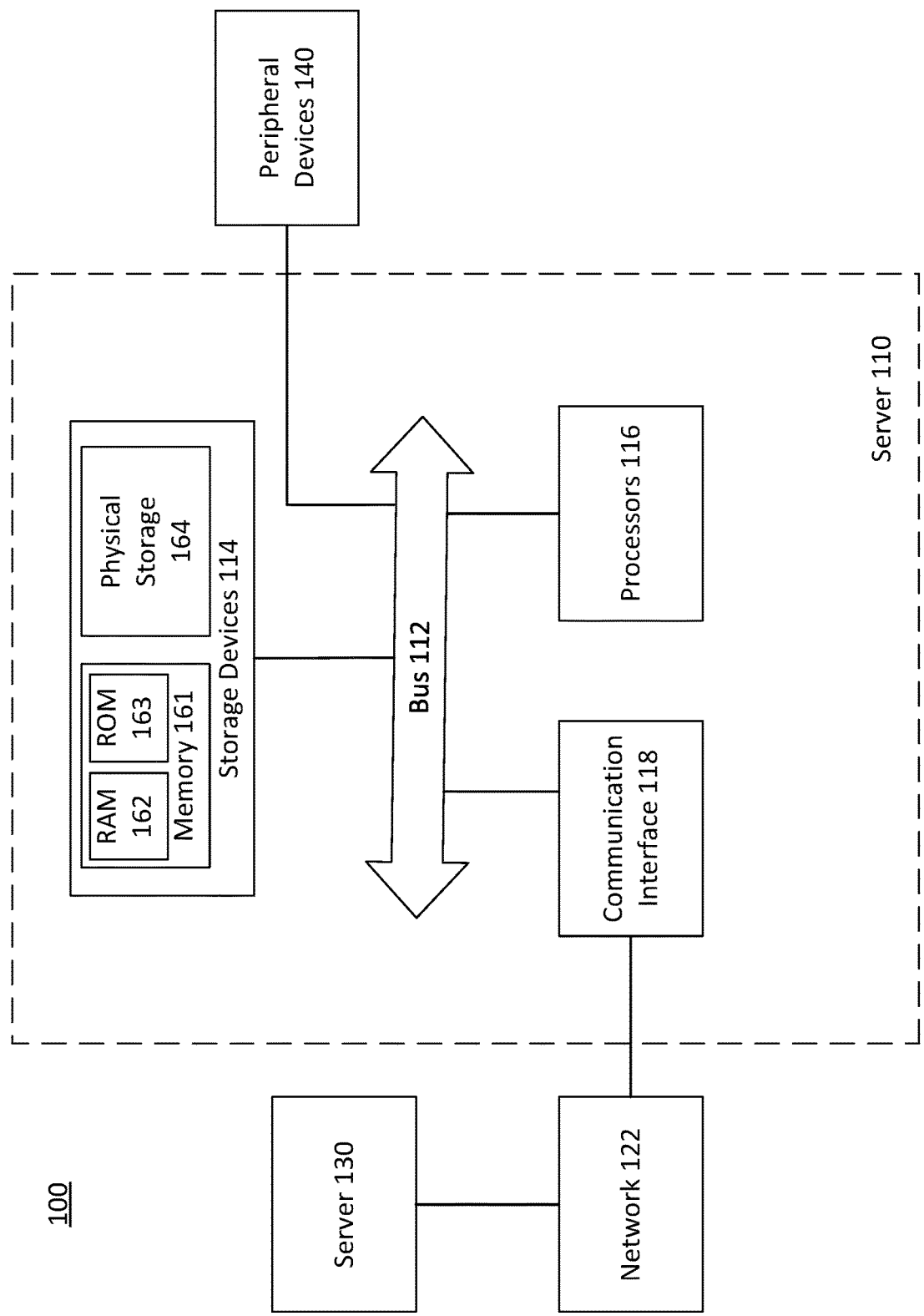
FIG. 2 illustrates a schematic diagram of an exemplary server of a database, according to some embodiments of the present disclosure.

Embodiments of the present disclosure resolve these issues by providing systems and methods for dynamic and adaptive data clustering in databases. FIG. 2 illustrates a schematic diagram of an exemplary server of a database, according to some embodiments of the present disclosure. According to FIG. 2, server 110 of database 100 comprises a bus 112 or other communication mechanism for communicating information, and one or more processors 116 communicatively coupled with bus 112 for processing information. Processors 116 can be, for example, one or more microprocessors. In some embodiments, database 100 can be an online analytical processing ("OLAP") database.

Server 110 can transmit data to or communicate with another server 130 through a network 122. Network 122 can be a local network, an internet service provider, internet, or any combination thereof. Communication interface 118 of server 110 is connected to network 122. In addition, server 110 can be coupled via bus 112 to peripheral devices 140, which comprises displays (e.g., cathode ray tube (CRT), liquid crystal display (LCD), touch screen, etc.) and input devices (e.g., keyboard, mouse, soft keypad, etc.).

Server 110 can be implemented using customized hard-wired logic, one or more ASICs or FPGAs, firmware, or program logic that in combination with the server causes server 110 to be a special-purpose machine.

Server 110 further comprises storage devices 114, which may include memory 161 and physical storage 164 (e.g., hard drive, solid-state drive, etc.). Memory 161 may include random access memory (RAM) 162 and read only memory (ROM) 163. Storage devices 114 can be communicatively coupled with processors 116 via bus 112. Storage devices 114 may include a main memory, which can be used for storing temporary variables or other intermediate information during execution of instructions to be executed by processors 116. Such instructions, after being stored in non-transitory storage media accessible to processors 116, render server 110 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Various forms of media can be involved in carrying one or more sequences of one or more instructions to processors 116 for execution. For example, the instructions can initially be carried out on a magnetic disk or solid-state drive of a remote computer. The remote computer can load the instructions into its dynamic memory and send the instructions over a telephone line using a modem. A modem local to server 110 can receive the data on the telephone line and use an infra-red transmitter to convert the data to an infra-red signal. An infra-red detector can receive the data carried in the infra-red signal and appropriate circuitry can place the data on bus 112. Bus 112 carries the data to the main memory within storage devices 114, from which processors 116 retrieves and executes the instructions.

Consistent with some embodiments of the disclosure, machine learning models can be implemented to predict data clustering algorithms for smart, adaptive and automatic data clustering. In other words, the prediction process becomes a classification problem: given a database, the input of a classification model are queries on the database, and the output is the table produced using a data clustering algorithm that offers better execution efficiency for the query. This output table is referred to as a target table.

Figure 3:
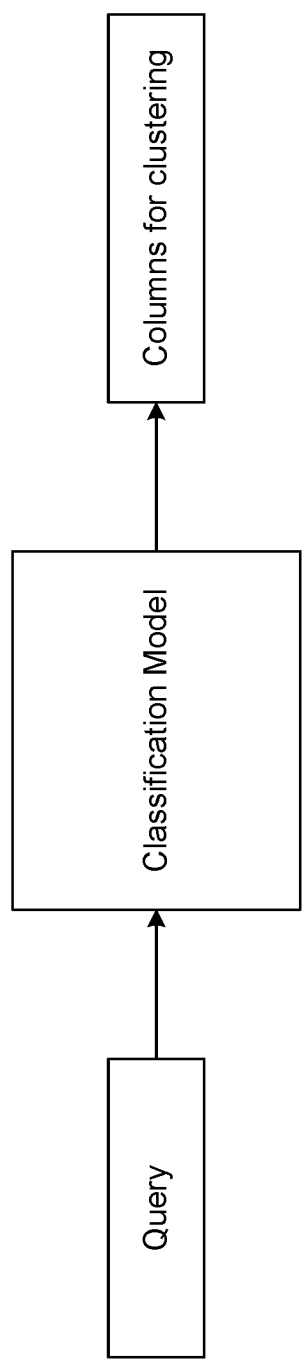
FIG. 3 illustrates an exemplary schematic of using a classification model in databases, according to some embodiments of the present disclosure.

FIG. 3 illustrates an exemplary schematic of using a classification model in databases, according to some embodiments of the present disclosure. According to FIG. 3, the classification model takes a database query as input, and outputs a filter column by which data clustering is conducted. After data clustering is performed according to the filter column, the resulting target table should provide the database query a more efficient execution. If the classification model can always produce a target table that is more efficient in executing the database query, the overall execution efficiency of the database can be greatly improved. In some embodiments, the filter column can be used as a table identification (ID) to identify the target table that is produced by performing data clustering on the filter column.

In some embodiments, data clustering can be performed using multiple data clustering algorithms. For example, data clustering can be performed using sort clustering algorithms or range bucket clustering algorithms. For each filter column or a set of filter columns, there can be multiple data clustering algorithms. As a result, the classification model can specify both the filter column or columns and the data clustering algorithm in order to identify a specific target table.

Figure 4:
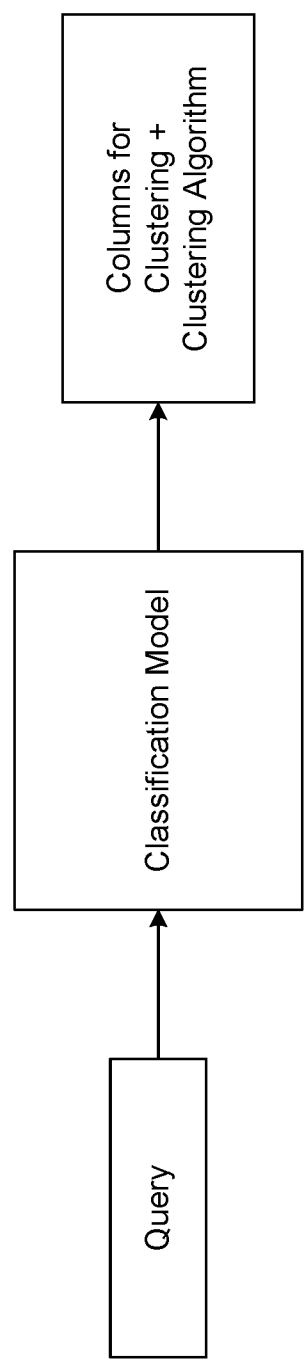
FIG. 4 illustrates an exemplary schematic of using a classification model involving multiple data clustering algorithms in databases, according to some embodiments of the present disclosure.

FIG. 4 illustrates an exemplary schematic of using a classification model involving multiple data clustering algorithms in databases, according to some embodiments of the present disclosure. On the basis of FIG. 3, the output of FIG. 4's classification model includes the specific data clustering algorithm in addition to the filter columns. In some embodiments, the filter column and the specific data clustering algorithm together can be used as a table ID to identify the target table that is produced by performing data clustering on the filter column with the specific data clustering algorithm.

Figure 5:
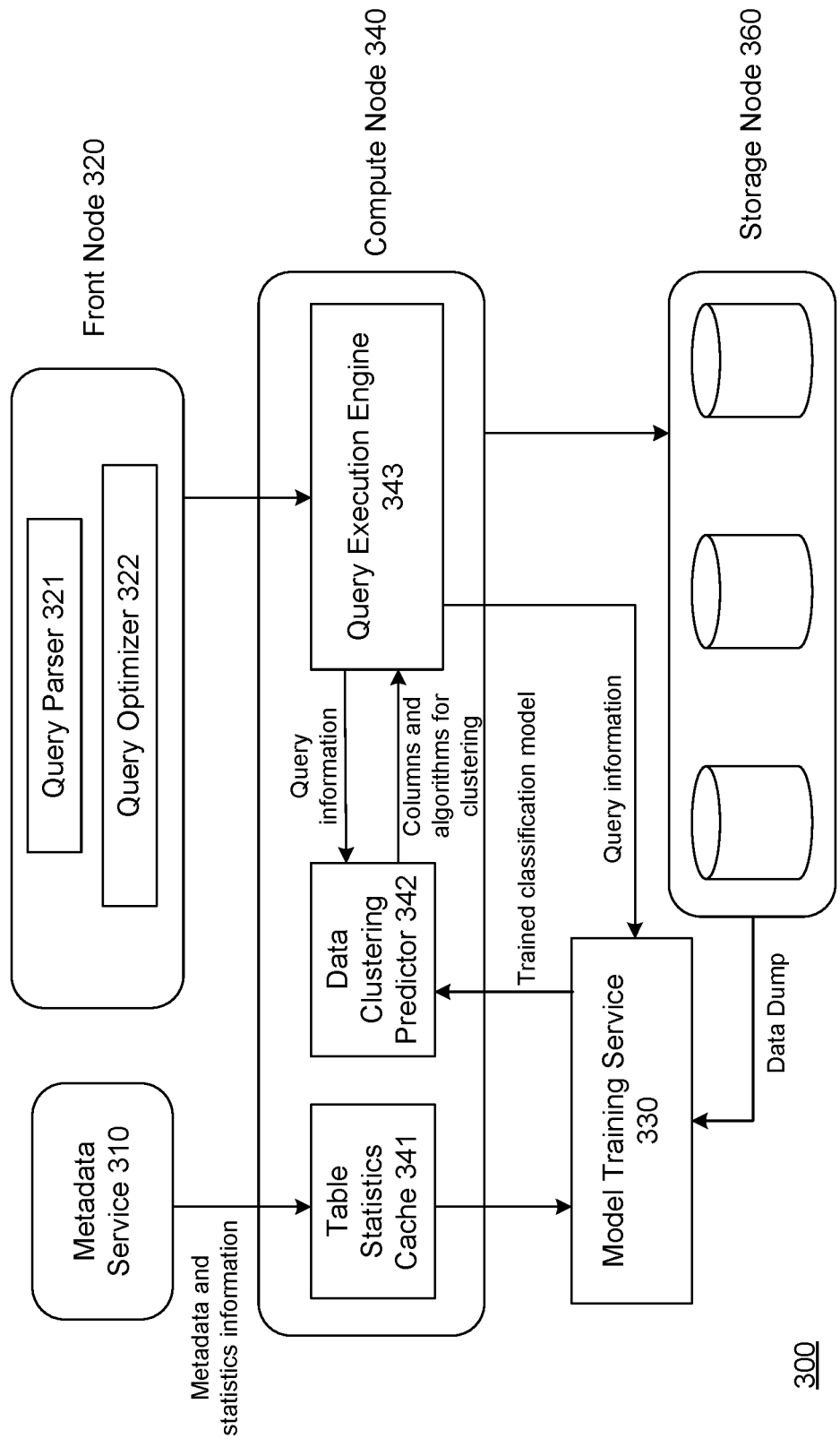
FIG. 5 illustrates a schematic diagram of an exemplary system incorporating adaptive data clustering for databases, according to some embodiments of the present disclosure.

In some embodiments, a system can implement the classification model in FIG. 3 or FIG. 4 and execute database queries. FIG. 5 illustrates a schematic diagram of an exemplary system incorporating adaptive data clustering for databases, according to some embodiments of the present disclosure. As shown in FIG. 5, system 300 comprises metadata service 310, front node 320, model training service 330, compute node 340, and storage node 360. In some embodiments, system 300 can be a part of an OLAP database system.

Metadata service 310 is configured to obtain and periodically update statistics information of the database tables. In some embodiments, statistics information may include how many distinct values are in each table and how many rows of each table satisfy the criteria of a query. In some embodiments, the metadata service 310 collects statistics information for different columns of each table.

Front node 320 is configured to perform parsing and query optimization based on a received query from a client device. Additionally, front node 320 may perform plan fragmentation, analyzes the plan, and decides filter columns based on the query. Front node 320 can break down a query into separate elements. For example, the following database query:

SELECT column_name(id)
FROM table_name
WHERE column_1=value_1 AND column_2=value_2;

can be broken down into elements of "SELECT," "column_name," "id," "FROM," "table_name," "WHERE," "column_1," "=," "value_1," "AND," "column_2" "=" and "value_2."

In some embodiments, front node 320 can comprise query parser 321 and query optimizer 322. Query parser 321 is configured to perform parsing on the received query. Query optimizer 322 is configured to perform query optimization on the received query. In some embodiments, front node 320 may be implemented on a server (e.g., server 110 of FIG. 2), together with compute node 340. In some embodiments, compute node 340 may be implemented on a server (e.g., server 110 of FIG. 2), and front node 320 may be implemented elsewhere, such as one of the one or more servers 130 that are located outside of server 110.

As shown in FIG. 5, model training service 330 is configured to train a classification model. Model training service 330 receives data from storage node 360 and query information from query execution engine 343. In some embodiments, model training service 330 is configured to fill the received data from storage node 360 into multiple tables. These tables can be referred to as training database tables. In some embodiments, these tables are produced using different data clustering algorithms. In some embodiments, the data clustering algorithms comprises performing data clustering in one or more filter columns, such as those shown in FIG. 1.

After the training database tables have been produced, model training service 330 replays the received query information on some or all of the training database tables and selects the table that offers what it determines to be the optimal performance for each query. In some embodiments, the selected table maps to the filter columns used in the specific data clustering algorithm. Then, model training service 330 trains a classification model using the queries and the corresponding selected table as training data. In some embodiments, the classification model is a machine learning model. In some embodiments, the classification model is a recurrent neural network. In some embodiments, after the training of the classification model, compute node 340 loads the trained classification model into memory and stay ready to predict the preferred clustering columns for each incoming query.

In some embodiments, model training service 330 receives statistics information of database tables from compute node 340 (further described below), and re-trains the classification model based on the statistics information of database tables. In some embodiments, data can be categorized into hot data and cold data according to the data's statistics such as the data's age or the data's access frequency. For example, a threshold can be used to decide on the hotness or the coldness of the data. In some embodiments, the data can be categorized as hot data if the recent access frequency exceed a threshold. In some embodiments, the data can be categorized as hot data if the recent update frequency exceeds a threshold. As a result, model training service 330 can re-train the classification model using the hot data only. This can reduce system 300's workload in re-training the classification model.

Compute node 340 is configured to execute queries. In some embodiments, compute node 340 comprises table statistics cache 341, data clustering predictor 342, and query execution engine 343.

Table statistics cache 341 is configured to cache the statistics information of the database, which is obtained from and periodically updated in metadata service 310. In some embodiments, table statistics cache 341 is further configured to transmit statistics information of the database to model training service 330, which can then take advantage of the statistics information in formulating data clustering algorithms.

Data clustering predictor 342 is configured to load the trained classification model, receive query information of incoming queries from query execution engine 343, and make prediction on the preferred filter column or columns for each incoming query. Data clustering predictor 342 makes predictions by feeding the incoming query into the trained classification model and analyzing trained classification model's output. In some embodiments, after the preferred filter column or columns are identified, data clustering predictor 342 can further identify a target table that is clustered according to the preferred filter column or columns. In some embodiments, in addition to filter columns, data clustering predictor 342 makes prediction on the preferred data clustering algorithms (e.g., output of the classification model in FIG. 4). In some embodiments, there are multiple database queries in the query information. Data clustering predictor 342 can be configured to run some or all of the multiple queries through the trained classification model and identify a number of filter columns or data clustering algorithms for the multiple queries. Data clustering predictor 342 can then select one set of filter columns or data clustering algorithm as a table ID, which points to a target table that is expected to offer a more efficient processing for the database queries.

Query execution engine 343 is configured to process query information of incoming queries from front node 320, feed the processed query information of incoming queries into data clustering predictor 342, receive filter column or columns and data clustering algorithms from data clustering predictor 342, and execute the incoming queries based on the received filter columns and data clustering algorithms. In some embodiments, the query information includes query predicates and filters, query operators such as "order by," and the data processing statistics of each operator such as the number of rows processed. In some embodiments, query execution engine 343 is further configured to perform data clustering according to the received filter column or columns and data clustering algorithms.

In some embodiments, instead of receiving filter columns and data clustering algorithms for clustering from data clustering predictor 342, query execution engine 343 can receive an identification or a table ID, of the target table. Then, query execution engine 343 can execute the incoming queries on the target table directly.

Storage node 360 contains plurality of database tables, which may be stored on various types of heterogeneous storage. Some examples of heterogenous storage types include OSS, Table Store, HBase, HDFS, PostgreSQL, MySQL, and others. In some embodiments, model training service provides data to model training service 330 as data dump, thus allowing model training service 330 to fill the provided data into data training tables.

Figure 6:
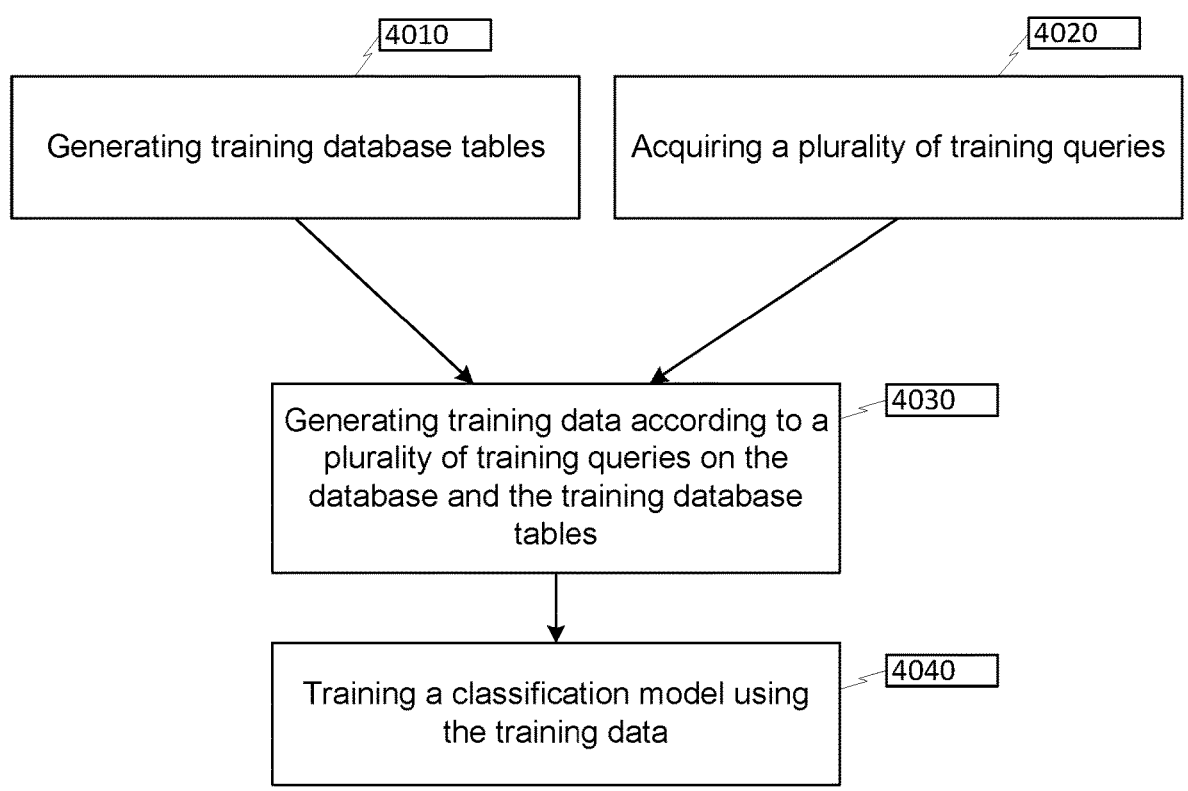
FIG. 6 illustrates a flowchart of an exemplary method for data clustering through adaptive data training on a database, according to some embodiments of the disclosure.

Embodiments of the present disclosure further provides a method that can provide data clustering through adaptive data training. FIG. 6 illustrates a flowchart of an exemplary method for data clustering through adaptive data training on a database, according to some embodiments of the disclosure. It is appreciated that method 4000 in FIG. 6 may be performed by server 110 of FIG. 2 or system 300 of FIG. 5.

In step 4010, training database tables are generated. In some embodiments, training database tables are generated by performing data clustering on the database. For example, data clustering can be performed numerous times on the database, each time using a different clustering algorithm to generate a corresponding training data table. In some embodiments, training database tables are generated by acquiring the training database tables from storage or memory. In some embodiments, step 4010 can be performed as a background process in the database. It is appreciated that step 4010 can be performed by metadata service 310 or model training service 330 of FIG. 5.

In some embodiments, the data clustering algorithm is formulated according to one or more specific filter column or columns. Using FIG. 1 as an example, a data clustering algorithm can be formulated as sorting according to the "id" column. Another data clustering algorithm can be formulated as sorting according to the "id" column first, and then according to the "date" column. The resulting database table is Table 1B of FIG. 1.

In some embodiments, the database comprises multiple tables. For example, an online shopping database can consist of a table of customers, a table of merchandises, a table of orders, and a table of merchants. The training database tables can be generated by performing data clustering on some or all of the multiple tables. For example, the database can have 4 tables, and a training database table can be generated by performing data clustering on one filter column of one table.

In some embodiments, data clustering can be performed using sort or range bucket clustering algorithms. A sort clustering algorithm can be performed on one or more filter columns. After the filter columns are sorted, the min/max values of each data block in the sorted columns can provide a more efficient processing for a number of queries, including queries with equal ("=") operations, range filtering operations, and "order by" operations.

Range bucket clustering algorithm can be performed on one or more columns in the database to allocate the data into a certain number of buckets. For example, for a column of "date" type (e.g., Table 1A of FIG. 1), a time period of a week or a month can be used as buckets. The range bucket clustering algorithm is effective for executing queries with range predicate operations. In addition, the range bucket clustering algorithm is less expensive to perform than the sort clustering algorithm.

In some embodiments, data clustering algorithms are chosen according to query patterns. For example, query information may be collected from a list of recent queries on the database, and columns that are most frequently referenced in the recent queries are selected as top columns. In some embodiments, the most frequently referenced columns refer to columns that have been referenced more than a threshold value. The threshold value can be a specific number (e.g., 500 times), or a specific percentage (e.g., 20% of all recent queries). In some embodiments, the system can decide how many top columns to select. For example, the system can decide to select K number of columns that are most frequently referenced in the recent queries as the top columns. After the selection of the top columns, sort clustering algorithm and range clustering algorithm can be performed on each of the top columns, producing a number of training data tables that are twice the number of top columns. In other words, the data clustering algorithms treat the top columns as filter columns. In some embodiments, additional training database tables may be produced by sorting multiple columns from the top columns at once. For example, Table 1B of FIG. 1 is generated by sorting from the smallest "id" to the largest "id" and then from the earliest "date" to the latest "date."

In step 4020, a plurality of training queries is acquired. In some embodiments, the plurality of training queries are acquired from user input or system generation. The training queries can be associated with information from the database. For example, the database may have information on the recent queries that the database has received, and the training queries can comprise some or all of the recent queries. In some embodiments, the database may have information on queries that are more frequently executed. And the training queries can comprise some or all of the more frequently executed queries. In some embodiments, the recent queries are defined by queries that were sent to the database after a threshold timestamp. For example, the threshold timestamp can be a specific time (e.g., Jul. 4, 2019 at 12:30 pm), or a specific period of time (e.g., the last three hours). It is appreciated that step 4020 can be performed by model training service 330, front node 320, or compute node 340 (e.g., query execution engine 343) of FIG. 5.

In step 4030, training data are generated according to the plurality of training queries and the training database tables. In some embodiments, generating training data involves executing each of the plurality of training queries obtained from step 4020 on some or all of the training data tables obtained from step 4010, collecting performance information on execution efficiency of executing the queries, and label the training data table that has the preferred execution efficiency (e.g., highest execution efficiency) in executing the corresponding query. In some embodiments, the efficiency in executing the corresponding query is evaluated based on the speed of execution or the amount of resources needed (e.g., memory space, network bandwidth, etc.) during execution. It is appreciated that step 4020 can be performed by model training service 330 of FIG. 5.

The training data table corresponding to the preferred efficiency in executing the corresponding query can be labeled as a ground truth for the corresponding query. As a result, for example, a tuple [query, table ID] is generated where the table ID pointing to the training data table corresponding to the preferred efficiency (as determined by the system) is coupled with the corresponding query. In some embodiments, the table ID can be simply represented by the filter column or columns according to which the clustering algorithm is executed. Using FIG. 1's Table 1A as an example, if a training data table is generated by performing data clustering on filter column "date," then this training data table can simply be represented by column "date." As a result, the tuple may also be written in the form [query, column].

In step 4040, a classification model is trained using the training data from step 4020. The classification model is used to determine a table ID pointing to an appropriate database table to execute a query on the database. In some embodiments, the appropriate database table is determined according to performance information in executing training queries. In some embodiments, the classification model is a machine learning model. The machine learning model is trained by feeding the tuples into the machine learning model and then updating machine learning model's weights or parameters. It is appreciated that step 4030 can be performed by model training service 330 of FIG. 5.

Figure 7:
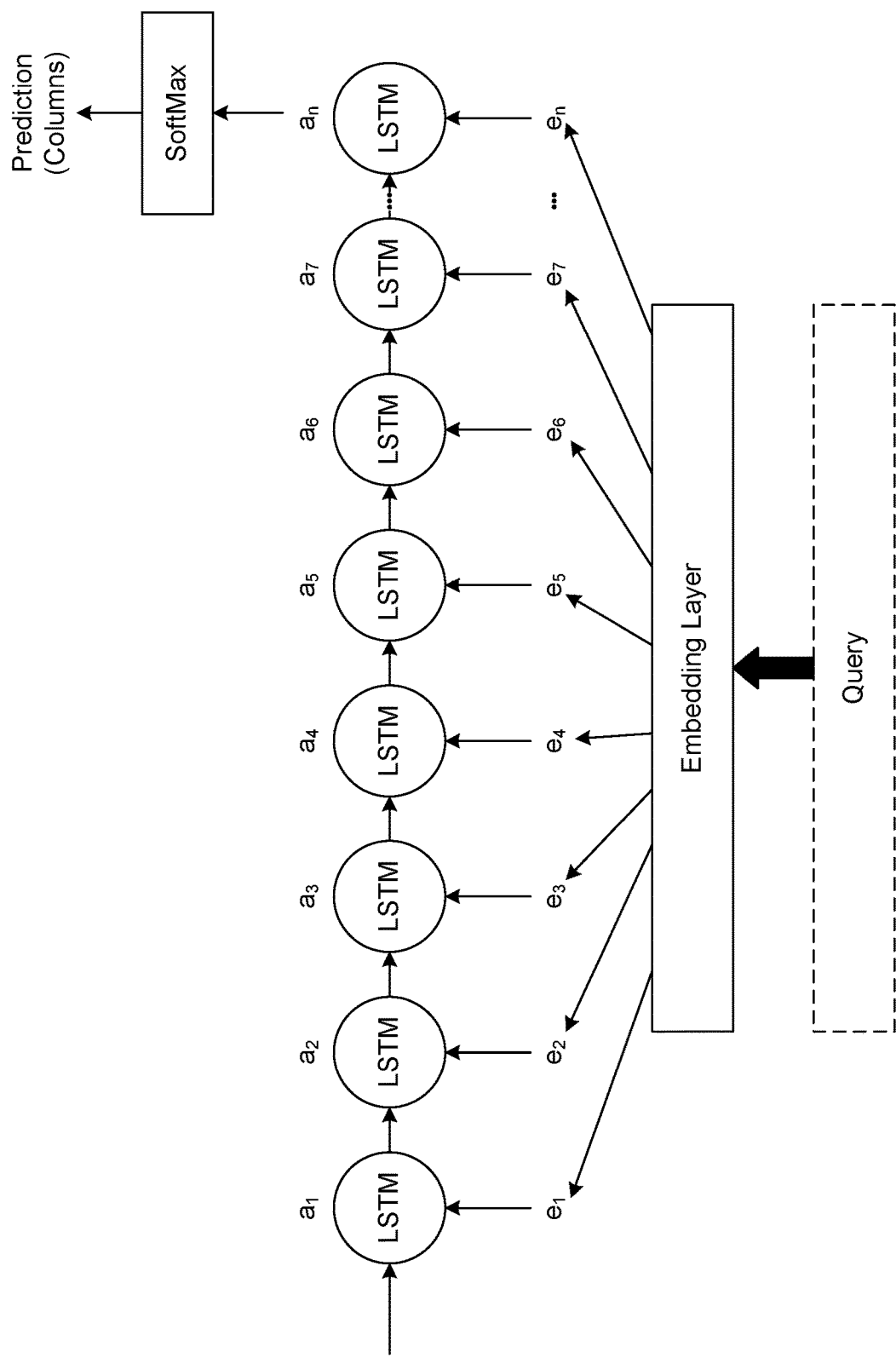
FIG. 7 illustrates a diagram demonstrating a recurrent neural network used in a training process, according to some embodiments of the present disclosure.

In some embodiments, a recurrent neural network ("RNN") is implemented as the machine learning model. FIG. 7 illustrates a diagram demonstrating a recurrent neural network used in a training process, according to some embodiments of the present disclosure. According to FIG. 7, for each query, there is an embedding layer mapping each word in the query to a vector:

$$E=\text{embedding}(Q)$$

where Q represents the query, and E represents the vector comprising elements $e_1$, $e_2$, $e_3$, etc. It is appreciated that the mapping process can be executed by front node 320 of FIG. 5.

The embedding layer is connected to an RNN layer. Each unit in the RNN layer can either be a long short-term memory ("LSTM") or a gated recurrent unit ("GRU"). For example, $$A=\text{LSTM}(E); \text{ or}$$

$$A=\text{GRU}(E)$$

where A comprises elements $a_1$, $a_2$, $a_3$, etc. In some embodiments, each $a_t$ can be determined based on the following calculation:

$$a_t=\sigma_h(W_h e_t + U_h a_{t-1} + b_h)$$

where $\sigma_h$ is an activation function and $W_h$, $U_h$, and $b_h$ are parameter matrices.

In some embodiments, a softmax layer can be added at the end of the RNN layer to output a factor, which acts as the output of the recurrent neural network. In other words, if there are K number of training data tables, the output factor would be a K-dimensional factor representing probabilities of each training data table.

In some embodiments, this recurrent neural network model can be trained using a back propagation algorithm. The recurrent neural network model takes the tuples as training data, and updates parameter matrices $W_h$, $U_h$, and $b_h$ or weights by back propagating the training data table that corresponds to an input query.

Figure 8:
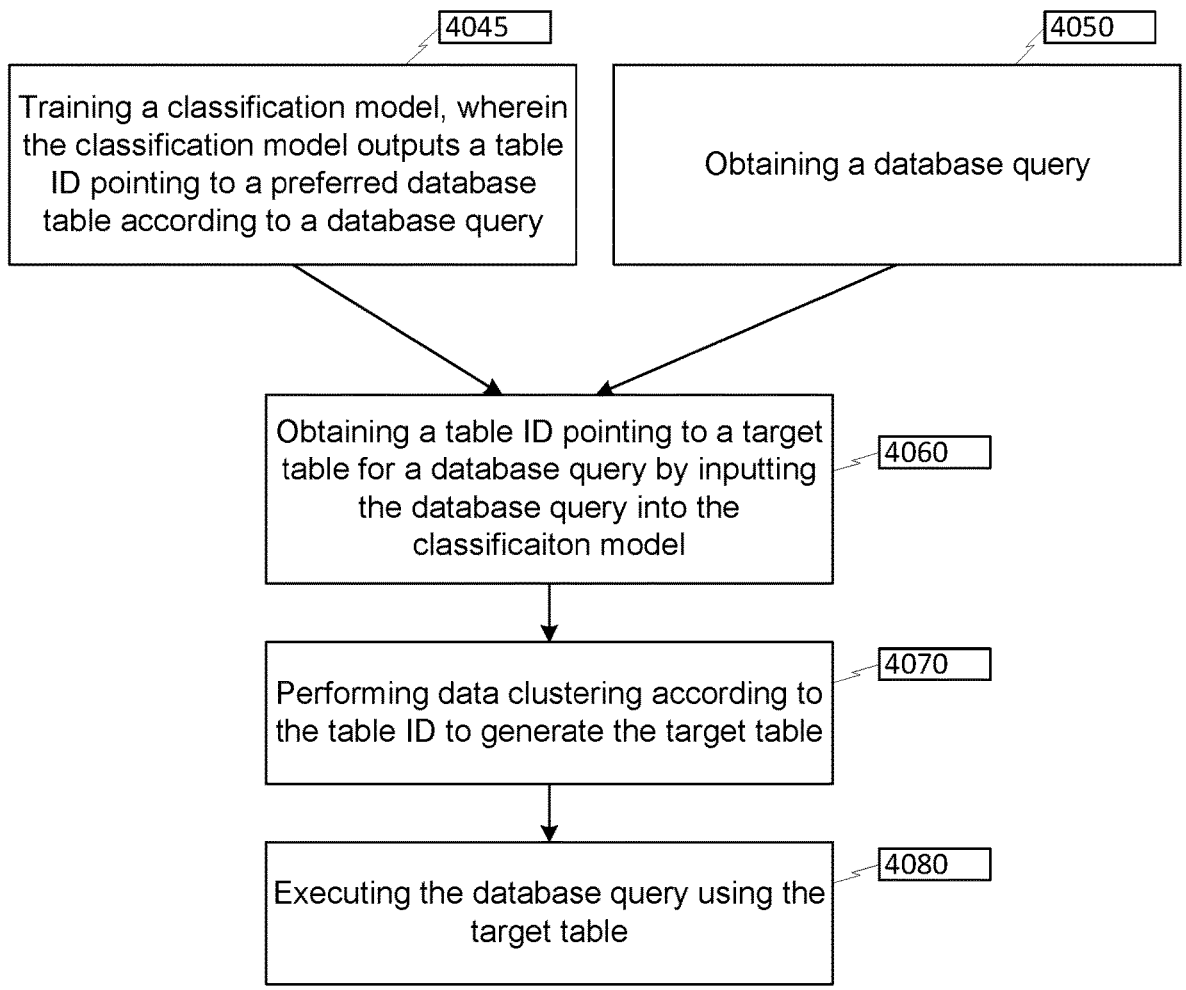
FIG. 8 illustrates a flowchart of an exemplary method for executing a database query on a trained classification model, according to some embodiments of the disclosure.

Embodiments of the present disclosure further provides a method to execute database queries based on target tables that are identified by a classification model. FIG. 8 illustrates a flowchart of an exemplary method for executing a database query on a trained classification model, according to some embodiments of the disclosure. It is appreciated that method 4100 in FIG. 8 may be performed by server 110 of FIG. 2 or system 300 of FIG. 5. In some embodiments, the trained classification model from step 4030 of method 4000 can be used to execute on a database query in order to find a target table for the database query.

In step 4045, a classification model is trained. The classification model outputs a table ID pointing to a preferred database table according to a database query. In some embodiments, the classification model is trained according to method 4000 of FIG. 6. In some embodiments, the classification model is a machine learning model.

In step 4050, a database query is obtained. In some embodiments, the database query is inputted by a user of the database system. The user seeks to retrieve data from the database according to the database query, and the user prefers to execute the database query with preferred execution efficiency. It is appreciated that step 4040 can be performed by front node 320 or query execution engine 343 of FIG. 5.

In step 4060, a table ID pointing to a target table for a database query is obtained by inputting the database query into the classification model. After the classification model finishes training in step 4045, the classification model is available to receive new incoming database queries as the classification model's input. After a database query is obtained in step 4050, the classification model can output the table ID pointing to a target table that corresponds to the database query. In some embodiments, the target table can be one of the many training database tables generated in step 4010 of method 4000. The target table is the classification model's preferred prediction to offer the most efficient processing for the database query. It is appreciated that step 4060 can be performed by compute node 340 (e.g., data clustering predictor 342) of FIG. 5.

In some embodiments, the table ID pointing to the target table is represented by a filter column or a specific data clustering algorithm (e.g., output of the classification model of FIG. 3 or FIG. 4). In some embodiments, step 4070 can be executed to generate the target table according to the table ID. In step 4070, the target table is generated by performing data clustering on the tables in the database according to the filter column or the specific data clustering algorithm. In some embodiments, there can be multiple filter columns corresponding to multiple tables in the database to represent the table ID. In some embodiments, there can be multiple data clustering algorithms corresponding to multiple tables in the database to represent the table ID. It is appreciated that step 4070 can be performed by compute node 340 (e.g., query execution engine 343) of FIG. 5.

In step 4080, the database query is executed on the target table. The target table is selected in step 4060, and therefore the target table is expected by the classification model to provide a more efficient execution of the database query. It is appreciated that step 4080 can be performed by compute node 340 (e.g., query execution engine 343) of FIG. 5.

Figure 9:
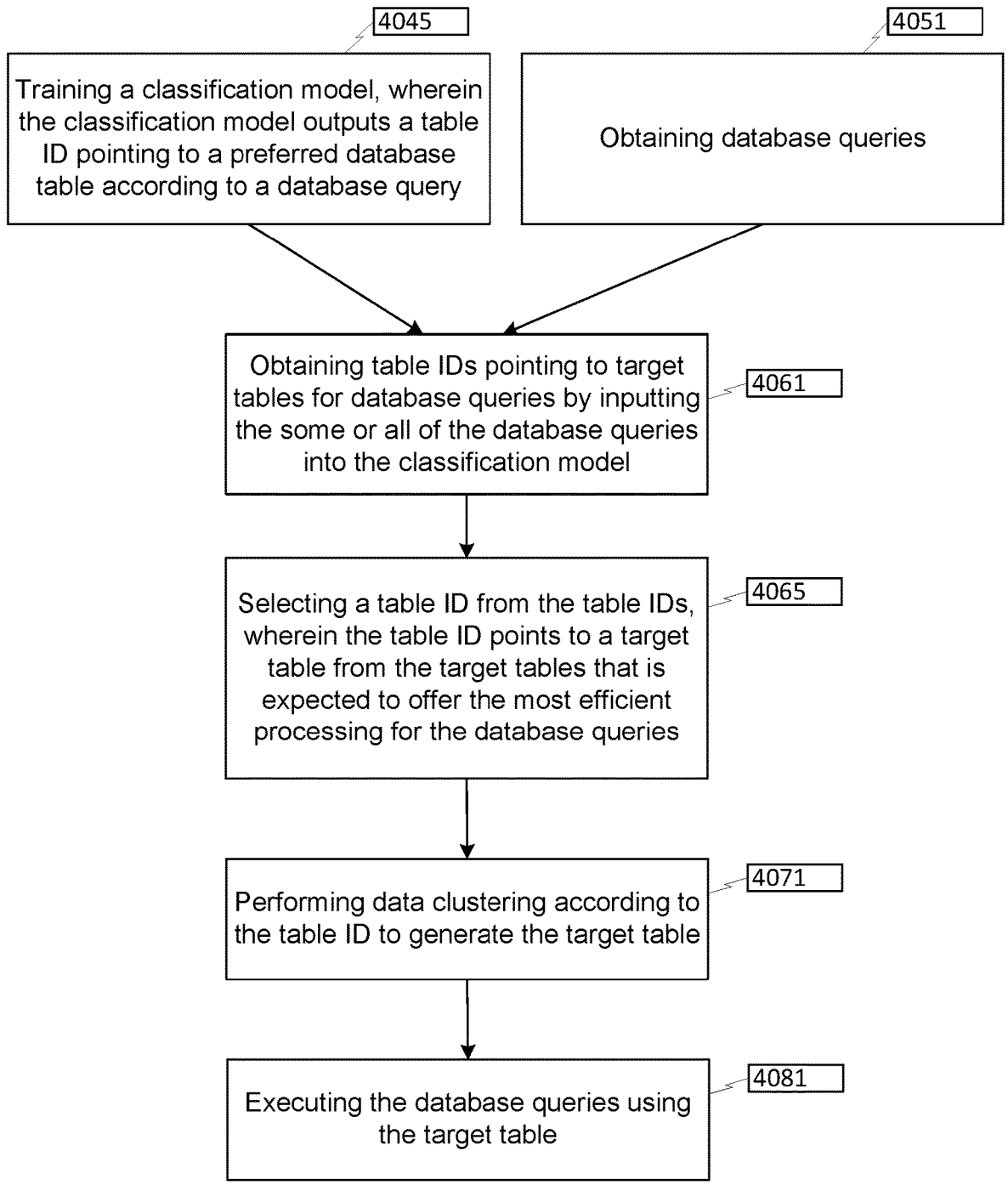
FIG. 9 illustrates a flowchart of an exemplary method for executing multiple database queries on a trained classification model, according to some embodiments of the disclosure.

In some embodiments, there can be multiple database queries. FIG. 9 illustrates a flowchart of an exemplary method for executing multiple database queries on a trained classification model, according to some embodiments of the disclosure. On basis of FIG. 8, method 4101 of FIG. 9 further comprises step 4051, 4061, 4065, 4071, and 4081. It is appreciated that method 4101 in FIG. 8 may be performed by server 110 of FIG. 2 or system 300 of FIG. 5. In some embodiments, the trained classification model from step 4030 of method 4000 can be used to execute on a database query in order to find a target table for the database query.

In step 4051, multiple database queries are obtained. It is appreciated that step 4051 can be performed by front node 320 or query execution engine 343 of FIG. 5.

In step 4061, table IDs pointing to target tables for the obtained database queries are obtained by inputting some or all of the database queries into the classification model. It is appreciated that step 4061 can be performed by compute node 340 (e.g., data clustering predictor 342) of FIG. 5.

In step 4065, a table ID is selected from the table IDs, wherein the selected table ID points to a target table (from the target tables) that is expected to offer a more efficient processing for the database queries. In some embodiments, the table ID is selected based on the number of occurrences of each table ID among the table IDs. Using table 1A of FIG. 1 as an example, if the classification model outputs a table ID "date" more times than any other table IDs, then table ID "date" can be selected as the table ID. It is appreciated that step 4065 can be performed by compute node 340 (e.g., data clustering predictor 342) of FIG. 5.

In some embodiments, the table ID pointing to the target table is represented by a filter column or a specific data clustering algorithm (e.g., output of the classification model of FIG. 3 or FIG. 4). In some embodiments, step 4071 can be executed to generate the target table according to the table ID. In step 4071, the target table is generated by performing data clustering on the tables in the database according to the filter column or the specific data clustering algorithm. In some embodiments, there can be multiple filter columns corresponding to multiple tables in the database to represent the table ID. In some embodiments, there can be multiple data clustering algorithms corresponding to multiple tables in the database to represent the table ID. It is appreciated that step 4071 can be performed by compute node 340 (e.g., query execution engine 343) of FIG. 5.

In step 4081, the database queries are executed on the target table. The target table is selected in step 4065, and therefore the target table is expected to provide a more efficient execution of the database queries. In some embodiments, the database queries can be executed one by one on the target table. It is appreciated that step 4081 can be performed by compute node 340 (e.g., query execution engine 343) of FIG. 5.

In some embodiments, the data clustering in step 4010 of FIG. 6 can be further improved by incorporating statistics of access frequency on data. Data clustering can incur cost, and performing data clustering can be very resource consuming. As a result, performing data clustering can become a bottleneck for the database system. To fix this problem, data can be categorized into hot data and cold data according to its statistics such as its age or its access frequency. For example, a threshold can be used to decide on the hotness or the coldness of the data. In some embodiments, the data can be categorized as hot data if the recent access frequency exceeds a threshold. In some embodiments, the data can be categorized as hot data if the recent update frequency exceeds a threshold.

Figure 10:
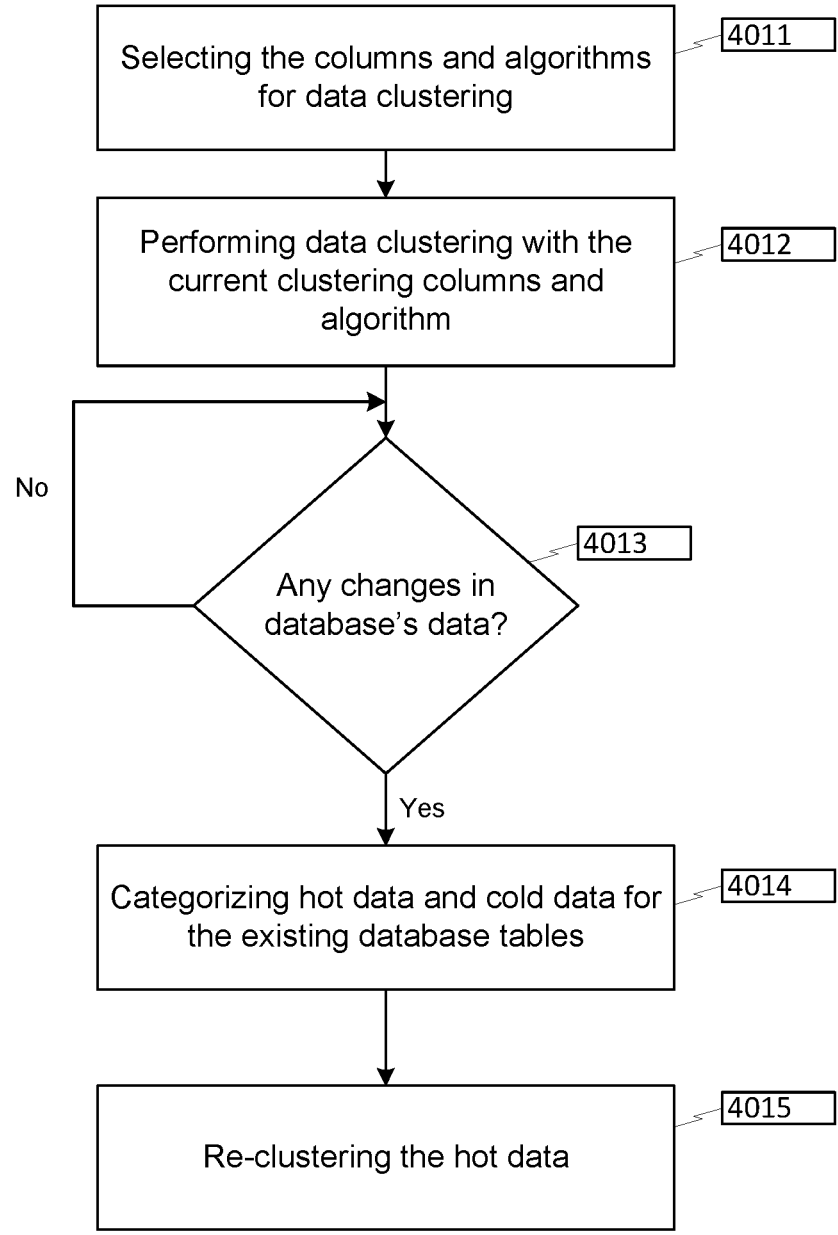
FIG. 10 illustrates a flowchart of an exemplary method for data clustering using hot/cold data separation, according to some embodiments of the disclosure.

FIG. 10 illustrates a flowchart of an exemplary method for data clustering using hot/cold data separation, according to some embodiments of the disclosure. In some embodiments, method 4100 of FIG. 10 can be a part of step 4010 in FIG. 6. In some embodiments, method 4100 of FIG. 10 may be performed by server 110 of FIG. 2 or system 300 of FIG. 5.

In step 4011, data clustering algorithms are selected for data clustering. In some embodiments, data clustering is performed using sort or range bucket clustering algorithms. In some embodiments, clustering algorithms are chosen according to the top columns in query patterns. It is appreciated that step 4011 can be performed by model training service 330 of FIG. 5.

In step 4012, data clustering is performed according to the selected data clustering algorithms. In some embodiments, data clustering is performed on data in the entire database, and multiple training database tables are produced as a result of the data clustering. It is appreciated that step 4012 can be performed by model training service 330 of FIG. 5.

In step 4013, it is detected whether there are any changes in the database's data. In some embodiments, changes in the database's data are detected when some data has been updated. In some embodiments, only the changes in the data identified by the top columns are detected. If changes are detected, step 4014 is executed. If changes are not detected, step 4013 is performed continuously until changes are detected. It is appreciated that step 4013 can be performed by metadata service 310 of FIG. 5.

In step 4014, data in the training database tables are categorized into hot data and cold data. In some embodiments, the categorizing process is conducted according to the data's statistics such as its age or its access frequency. For example, a threshold can be used to decide on the hotness or the coldness of the data. In some embodiments, the data can be categorized as hot data if the recent access frequency exceeds a threshold. In some embodiments, the data can be categorized as hot data if the recent update frequency exceeds a threshold. It is appreciated that step 4014 can be performed by metadata service 310 of FIG. 5.

In some embodiments, training database tables of a database can be divided into partitions. If data inside a partition becomes cold, the partition does not need to be re-clustered. As a result, only the partitions with hot data inside a training database table would undergo re-clustering. By reducing the re-clustering of the training database table, data movement is reduced, hence effectively lowering the overall cost in data clustering. In some embodiments, machine learning methods can be used to optimize the accuracy of the cold/hot data recognition.

In step 4015, data that are identified as hot is re-clustered. In some embodiments, new training database tables are generated according to re-clustered data, and the new training database tables replace the old training database tables that contain the hot data. In some embodiments, the existing training database tables are updated using re-clustered data. It is appreciated that step 4015 can be performed by model training service 330 of FIG. 5.

In some embodiments, the cold data can also be ignored during the training of the classification model in step 4040 of FIG. 6, hence improving the training speed in training the classification model. To maintain performance of the database system, trainings of the classification model can be conducted periodically and frequently to quickly adapt to patterns in recent queries or changes in data distribution. The more frequent the model is re-trained, the quicker the changes in the database's data can be detected.

In some embodiments, a database system decides on when to re-cluster data based on a number of qualifying conditions. In some embodiments, the database system can keep track of its classification model's performance. When the classification model's performance is no longer above a threshold, the database system may choose to re-cluster data. In some embodiments, the database system can keep track of timings of re-clustering. When the data has not been clustered or re-clustered for a certain amount of time (e.g., one week), the database system may choose to re-cluster the data. In some embodiments, the database system can keep track of how much data has changed. When the change in data has exceeded a threshold, the database system may choose to re-cluster the data.

In some embodiments, the training process can be off-loaded to an offline service to avoid competition for resources with query executions. The training data table can also be stored in an offline data storage. For example, the training data table can be stored in storage node 360 of FIG. 5 to avoid competing storage resources with query execution.

Figure 11:
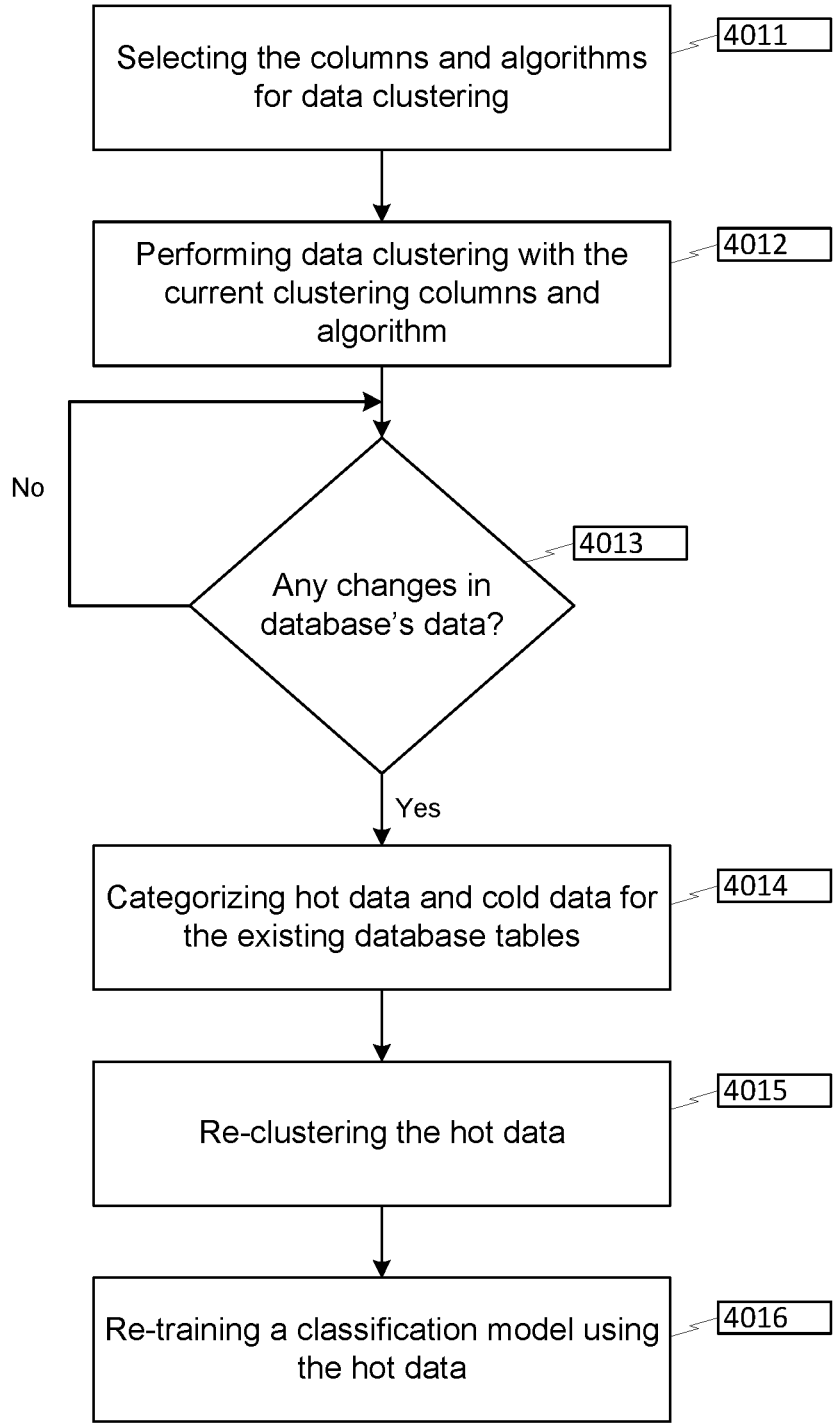
FIG. 11 illustrates a flowchart of an exemplary method for data clustering using hot/cold data separation in re-training a classification model, according to some embodiments of the disclosure.

FIG. 11 illustrates a flowchart of an exemplary method for data clustering using hot/cold data separation in re-training a classification model, according to some embodiments of the disclosure. On basis of FIG. 10, method 4300 of FIG. 11 further comprises step 4016. In some embodiments, method 4300 in FIG. 11 may be performed by server 110 of FIG. 2 or system 300 of FIG. 5.

In step 4016, the machine learning model is re-trained using hot data. In some embodiments, the re-training process comprises executing queries on new training database tables generated by re-clustering hot data, generating new training data from executing the queries, and using the new training data to train the classification model. In some embodiments, the re-training process is conducted through steps 4010-4040 of FIG. 6 using new training database tables generated by re-clustering hot data as training database tables. It is appreciated that step 4016 can be performed by model training service 330 of FIG. 5.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. It is understood that multiple ones of the above described modules/units may be combined as one module/unit, and each of the above described modules/units may be further divided into a plurality of sub-modules/sub-units.

The embodiments may further be described using the following clauses:

1. A method for generating an adaptive classification model in a database system, the method comprising:

acquiring a plurality of database tables by performing data clustering on a database;

acquiring a plurality of queries associated with information from the database;

generating training data by executing each of the plurality of queries on the plurality of database tables; and training a classification model using the training data, wherein the classification model is used to select a database table for a query based on corresponding performance information associated with the query on the database during execution of the query.

2. The method of clause 1, wherein generating a plurality of database tables by performing data clustering on a database further comprising:

performing data clustering using a sort algorithm or a range bucket algorithm.

3. The method of clause 1 or 2, wherein generating a plurality of database tables by performing data clustering on a database further comprising:

categorizing data in the database into a first group of data and a second group of data, wherein the first group of data is updated more frequently than the second group of data; and performing data clustering on the first group of data at a higher frequency than performing data clustering on the second group of data.

4. The method of clause 3, wherein generating a plurality of database tables by performing data clustering on a database further comprising:

categorizing partitions in a database table into a first group of partitions and a second group of partitions;

performing data clustering on the first group of partitions at a higher frequency than performing data clustering on the second group of partitions.

5. The method of any one of clauses 1-4, wherein generating a plurality of database tables by performing data clustering on a database further comprising:

performing data clustering in response to the performance information of the classification model, timing of last data clustering, or an extent of change in the data.

6. The method of any one of clauses 1-5, wherein generating a plurality of database tables by performing data clustering on the database further comprising:

selecting a column from the database based on a threshold condition involving a number of times that the column is referenced;

generating a plurality of database tables, wherein at least some of the plurality of database tables are generated by performing data clustering on the column.

7. The method of any one of clauses 1-6, wherein generating training data by executing each of the plurality of queries on the plurality of database tables further comprising:

executing a query in the plurality of queries on the plurality of database tables;

collecting performance information for the plurality of database tables from executing the query;

labelling a database table from the plurality of database tables based on the performance information; and generating training data by coupling the labelled database table with the executed query.

8. The method of any one of clauses 1-7, wherein the performance information corresponds to a determined efficiency for executing the query.

9. The method of any one of clauses 1-8, wherein the database tables are stored in an offline data storage.

10. The method of any one of clauses 1-9, wherein generating training data by executing each of the plurality of queries on the plurality of database tables further comprising:

generating additional training data according to a plurality of additional queries on the database and a plurality of updated database tables.

11. The method of clause 10, wherein training the classification model using the training data further comprising:

training the classification model periodically using the additional training data.

12. The method of any one of clauses 1-11, wherein the classification model is a neural network model.

13. The method of any one of clauses 1-12, wherein training a classification model using the training data further comprising:

mapping each query to a vector comprising of elements;

inputting the vector into a recurrent neural network (RNN) layer, wherein each element in the vector is mapped to a unit of the RNN layer;

generating a classification vector according to an output from the RNN layer; and updating weights of the recurrent neural network model using back propagation algorithms according to the training data.

14. The method of clause 13, wherein generating a classification vector according to an output from the recurrent neural network layer further comprising:

generating a classification vector from a softmax layer added onto the RNN layer.

15. The method of any one of clauses 11-14, wherein the unit of the RNN layer is a long short-term memory unit or a gated recurrent unit.

16. A method for executing a query on a database of a database system using an adaptive classification model, comprising:

obtaining a database query;

generating a table identification pointing to a target database table by inputting the database query into a classification model, the classification model being used to select a database table from a plurality of database tables generated from data clustering on the database, wherein the selection of the database table is based on corresponding performance information associated with the database query on the database; and executing the database query on the target database table.

17. The method of clause 16, further comprising:

obtaining a plurality of database queries;

selecting a table identification from a plurality of table identifications generated by inputting the plurality of database queries into the classification model, wherein the table identification is selected based on corresponding performance information associated with the database query on the database; and executing the plurality of database queries on the target table identified by the table identification.

18. The method of clause 16 or 17, further comprising:

performing data clustering according to the table identification to generate the target table.

19. A database system, comprising:

a memory storing a set of instructions; and
a processor configured to execute the set of instructions to cause the database system to:
    generate a plurality of database tables by performing data clustering on a database,
    acquire a plurality of queries associated with information from the database;
    generate training data by executing each of the plurality of queries on the plurality of database tables; and
    train a classification model using the training data, wherein the classification model is used to select a database table for a query based on corresponding performance information associated with the query on the database during execution of the query.

20. The database system according to clause 19, wherein the process is further configured to cause the data storage system to:

categorize data in the database into a first group of data and a second group of data, wherein the first group of data is updated more frequently than the second group of data; and perform data clustering on the first group of data at a higher frequency than performing data clustering on the second group of data.

21. The database system according to clauses 19 or 20, wherein the process is further configured to cause the data storage system to:

select a column from the database based on a threshold condition involving a number of times that the column is referenced;

generate a plurality of database tables, wherein at least some of the plurality of database tables are generated by performing data clustering on the column.

22. The database system according to any one of clauses 19-21, wherein the process is further configured to cause the data storage system to:

execute a query in the plurality of queries on the plurality of database tables;

collect performance information for the plurality of database tables from executing the query;

label a database table from the plurality of database tables based on the performance information; and generate training data by coupling the labelled database table with the executed query.

23. The database system according to any one of clauses 19-22, wherein the process is further configured to cause the data storage system to:

map each query to a vector comprising of elements;

input the vector into a recurrent neural network (RNN) layer, wherein each element in the vector is mapped to a unit of the RNN layer;

generate a classification vector according to an output from the RNN layer; and update weights of the recurrent neural network model using back propagation algorithms according to the training data.

24. A database system, comprising:

a memory storing a set of instructions; and a processor configured to execute the set of instructions to cause the database system to:

obtain a database query;

generate a selected table by inputting the database query into a classification model that is used to select a database table from a plurality of database tables generated from data clustering on a database, wherein the selection of the database table is based on corresponding performance information associated with the database query on the database; and execute the database query on the target table.

25. A non-transitory computer readable medium that stores a set of instructions that is executable by one or more processors of an apparatus to cause the apparatus to initiate a method comprising:

generating a plurality of database tables by performing data clustering on a database;

acquiring a plurality of queries associated with information from the database;

generating training data by executing each of the plurality of queries on the plurality of database tables; and training a classification model using the training data, wherein the classification model is used to select a database table for a query based on corresponding performance information associated with the query on the database during execution of the query.

26. The non-transitory computer readable medium according to clause 25, wherein the set of instructions that is executable by one or more processors of the apparatus to cause the apparatus to further perform:

categorizing data in the database into a first group of data and a second group of data, wherein the first group of data is updated more frequently than the second group of data; and performing data clustering on the first group of data at a higher frequency than performing data clustering on the second group of data.

27. The non-transitory computer readable medium according to clause 25 or 26, wherein the set of instructions that is executable by one or more processors of the apparatus to cause the apparatus to further perform:

selecting a column from the database based on a threshold condition involving a number of times that the column is referenced;

generating a plurality of database tables, wherein at least some of the plurality of database tables are generated by performing data clustering on the column.

28. The non-transitory computer readable medium according to any one of clauses 25-27, wherein the set of instructions that is executable by one or more processors of the apparatus to cause the apparatus to further perform:

executing a query in the plurality of queries on the plurality of database tables;

collecting performance information for the plurality of database tables from executing the query;

labelling a database table from the plurality of database tables based on the performance information; and generating training data by coupling the labelled database table with the executed query.

29. The non-transitory computer readable medium according to clauses 25-28, wherein the set of instructions that is executable by one or more processors of the apparatus to cause the apparatus to further perform:

mapping each query to a vector comprising of elements;

inputting the vector into a recurrent neural network (RNN) layer, wherein each element in the vector is mapped to a unit of the RNN layer;

generating a classification vector according to an output from the RNN layer; and updating weights of the recurrent neural network model using back propagation algorithms according to the training data.

30. A non-transitory computer readable medium that stores a set of instructions that is executable by one or more processors of an apparatus to cause the apparatus to initiate a method comprising:

obtaining a database query;

generating a target table by inputting the database query into the classification model that is used to select a database table from a plurality of database tables generated from data clustering on a database, wherein the selection of the database table is based on corresponding performance information associated with the database query on the database; and executing the database query on the target table.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method for generating an adaptive classification model in a database system, the method comprising:
   generating a plurality of database tables by performing data clustering on a database;
   acquiring a plurality of queries associated with information from the database;
   generating training data by executing each of the plurality of queries on the plurality of database tables; and
   training the adaptive classification model using the training data, wherein the adaptive classification model is used to select a database table for a query based on corresponding performance information associated with the query on the database during execution of the query.

2. The method of claim 1, wherein generating a plurality of database tables by performing data clustering on a database further comprising:
   categorizing data in the database into a first group of data and a second group of data, wherein the first group of data is updated more frequently than the second group of data; and
   performing data clustering on the first group of data at a higher frequency than performing data clustering on the second group of data.

3. The method of claim 2, wherein generating a plurality of database tables by performing data clustering on a database further comprising:
   categorizing partitions in a database table into a first group of partitions and a second group of partitions;
   performing data clustering on the first group of partitions at a higher frequency than performing data clustering on the second group of partitions.

4. The method of claim 1, wherein generating a plurality of database tables by performing data clustering on a database further comprising:
   performing data clustering in response to the performance information of the classification model, timing of last data clustering, or an extent of change in the data.

5. The method of claim 1, wherein generating a plurality of database tables by performing data clustering on the database further comprising:
   selecting a column from the database based on a threshold condition involving a number of times that the column is referenced;
   generating a plurality of database tables, wherein at least some of the plurality of database tables are generated by performing data clustering on the column.

6. The method of claim 1, wherein generating training data by executing each of the plurality of queries on the plurality of database tables further comprising:
   executing a query in the plurality of queries on the plurality of database tables;
   collecting performance information for the plurality of database tables from executing the query;
   labelling a database table from the plurality of database tables based on the performance information; and
   generating training data by coupling the labelled database table with the executed query.

7. The method of claim 1, wherein the performance information corresponds to a determined efficiency for executing the query.

8. The method of claim 1, wherein the database tables are stored in an offline data storage.

9. The method of claim 1, wherein generating training data by executing each of the plurality of queries on the plurality of database tables further comprising:
   generating additional training data according to a plurality of additional queries on the database and a plurality of updated database tables.

10. The method of claim 9, wherein training the classification model using the training data further comprising:
    training the classification model periodically using the additional training data.

11. The method of claim 10, wherein the unit of the RNN layer is a long short-term memory unit or a gated recurrent unit.

12. The method of claim 1, wherein the classification model is a neural network model.

13. The method of claim 1, wherein training a classification model using the training data further comprising:
    mapping each query to a vector comprising of elements;
    inputting the vector into a recurrent neural network (RNN) layer, wherein each element in the vector is mapped to a unit of the RNN layer;
    generating a classification vector according to an output from the RNN layer; and
    updating weights of the recurrent neural network model using back propagation algorithms according to the training data.

14. A database system, comprising:
    a memory storing a set of instructions; and
    a processor configured to execute the set of instructions to cause the database system to:
      generate a plurality of database tables by performing data clustering on a database,
      acquire a plurality of queries associated with information from the database;
      generate training data by executing each of the plurality of queries on the plurality of database tables; and
      train an adaptive classification model using the training data, wherein the adaptive classification model is used to select a database table for a query based on corresponding performance information associated with the query on the database during execution of the query.

15. The database system according to claim 14, wherein the process is further configured to cause the data storage system to:
    categorize data in the database into a first group of data and a second group of data, wherein the first group of data is updated more frequently than the second group of data; and
    perform data clustering on the first group of data at a higher frequency than performing data clustering on the second group of data.

16. The database system according to claim 14, wherein the process is further configured to cause the data storage system to:
    execute a query in the plurality of queries on the plurality of database tables;
    collect performance information for the plurality of database tables from executing the query;
    label a database table from the plurality of database tables based on the performance information; and
    generate training data by coupling the labelled database table with the executed query.

17. The database system according to claim 14, wherein the process is further configured to cause the data storage system to:
- map each query to a vector comprising of elements;
- input the vector into a recurrent neural network (RNN) layer, wherein each element in the vector is mapped to a unit of the RNN layer;
- generate a classification vector according to an output from the RNN layer; and
- update weights of the recurrent neural network model using back propagation algorithms according to the training data.

18. A non-transitory computer readable medium that stores a set of instructions that is executable by one or more processors of an apparatus to cause the apparatus to initiate a method comprising:
- generating a plurality of database tables by performing data clustering on a database;
- acquiring a plurality of queries associated with information from the database;
- generating training data by executing each of the plurality of queries on the plurality of database tables; and
- training an adaptive classification model using the training data, wherein the adaptive classification model is used to select a database table for a query based on corresponding performance information associated with the query on the database during execution of the query.

19. The non-transitory computer readable medium according to claim 18, wherein the set of instructions that is executable by one or more processors of the apparatus to cause the apparatus to further perform:
- executing a query in the plurality of queries on the plurality of database tables;
- collecting performance information for the plurality of database tables from executing the query;
- labelling a database table from the plurality of database tables based on the performance information; and
- generating training data by coupling the labelled database table with the executed query.

20. The non-transitory computer readable medium according to claim 18, wherein the set of instructions that is executable by one or more processors of the apparatus to cause the apparatus to further perform:
- mapping each query to a vector comprising of elements;
- inputting the vector into a recurrent neural network (RNN) layer, wherein each element in the vector is mapped to a unit of the RNN layer;
- generating a classification vector according to an output from the RNN layer; and
- updating weights of the recurrent neural network model using back propagation algorithms according to the training data.

* * * * *